(12) United States Patent
Kerns et al.

(10) Patent No.: US 10,458,260 B2
(45) Date of Patent: Oct. 29, 2019

(54) NOZZLE AIRFOIL DECOUPLED FROM AND ATTACHED OUTSIDE OF FLOW PATH BOUNDARY

(71) Applicant: General Electric Company, Schenectady, NY (US)

(72) Inventors: Daniel Patrick Kerns, Mason, OH (US); Brandon ALlanson Reynolds, Cincinnati, OH (US); Mark Eugene Noe, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 287 days.

(21) Appl. No.: 15/603,829

(22) Filed: May 24, 2017

(65) Prior Publication Data

US 2018/0340431 A1    Nov. 29, 2018

(51) Int. Cl.
| | | |
|---|---|---|
| *F04D 29/44* | (2006.01) | |
| *F01D 9/04* | (2006.01) | |
| *F01D 9/06* | (2006.01) | |
| *F01D 25/00* | (2006.01) | |
| *F01D 25/24* | (2006.01) | |

(52) U.S. Cl.
CPC ............ *F01D 9/041* (2013.01); *F01D 9/042* (2013.01); *F01D 9/065* (2013.01); *F01D 25/005* (2013.01); *F01D 25/246* (2013.01); *F05D 2240/12* (2013.01); *F05D 2260/20* (2013.01); *F05D 2260/30* (2013.01); *F05D 2300/10* (2013.01); *F05D 2300/6033* (2013.01)

(58) Field of Classification Search
CPC ... F01D 9/042; F05D 2260/20; F05D 2260/30
USPC ............ 415/191, 208.1, 209.2, 209.3
See application file for complete search history.

(56) References Cited

U.S. PATENT DOCUMENTS

| | | | |
|---|---|---|---|
| 3,209,640 A | | 10/1965 | Waivers |
| 4,566,851 A | | 1/1986 | Comeau et al. |
| 4,820,097 A | | 4/1989 | Maeda et al. |
| 5,160,251 A | * | 11/1992 | Ciokajlo ............... F01D 25/162 415/142 |
| 5,211,537 A | | 5/1993 | Langston et al. |
| 5,308,226 A | * | 5/1994 | Venkatasubbu ....... F01D 17/162 415/160 |
| 5,591,003 A | | 1/1997 | Boyd et al. |
| 6,164,903 A | * | 12/2000 | Kouris ..................... F01D 9/04 415/135 |

(Continued)

*Primary Examiner* — John Kwon
(74) *Attorney, Agent, or Firm* — Dority & Manning, P.A.

(57) ABSTRACT

Flow path assemblies for gas turbine engines are provided. For example, a flow path assembly defining a flow path through a gas turbine engine, as well as axial and radial directions that are orthogonal to one another and a circumferential direction extending about the axial direction, comprises a nozzle airfoil having a first end opposite a second end and a wall defining a flow path boundary. The wall has an opening therein through which the second end of the nozzle airfoil protrudes such that the second end extends outside of the flow path. The flow path assembly further comprises a cap extending over the second end of the nozzle airfoil and an attachment member extending through the second end and the cap to attach the second end to the cap. Other embodiments of a flow path assembly having nozzle airfoils decoupled from the flow path boundary also are provided.

20 Claims, 6 Drawing Sheets

(56) References Cited

U.S. PATENT DOCUMENTS

| | | | |
|---|---|---|---|
| 6,514,041 B1* | 2/2003 | Matheny | F01D 11/18 |
| | | | 415/177 |
| 7,037,065 B2 | 5/2006 | Reigl | |
| 7,648,336 B2* | 1/2010 | Cairo | F01D 9/042 |
| | | | 415/209.4 |
| 8,905,711 B2 | 12/2014 | Suciu et al. | |
| 8,998,575 B2* | 4/2015 | Lucashu | F01D 9/04 |
| | | | 415/190 |
| 2010/0092280 A1* | 4/2010 | Draper | F02C 3/26 |
| | | | 415/178 |
| 2014/0356158 A1 | 12/2014 | Barnett | |
| 2016/0258305 A1 | 9/2016 | Wilber | |
| 2016/0305263 A1 | 10/2016 | Yagi et al. | |
| 2017/0016341 A1 | 1/2017 | Stapleton et al. | |

* cited by examiner

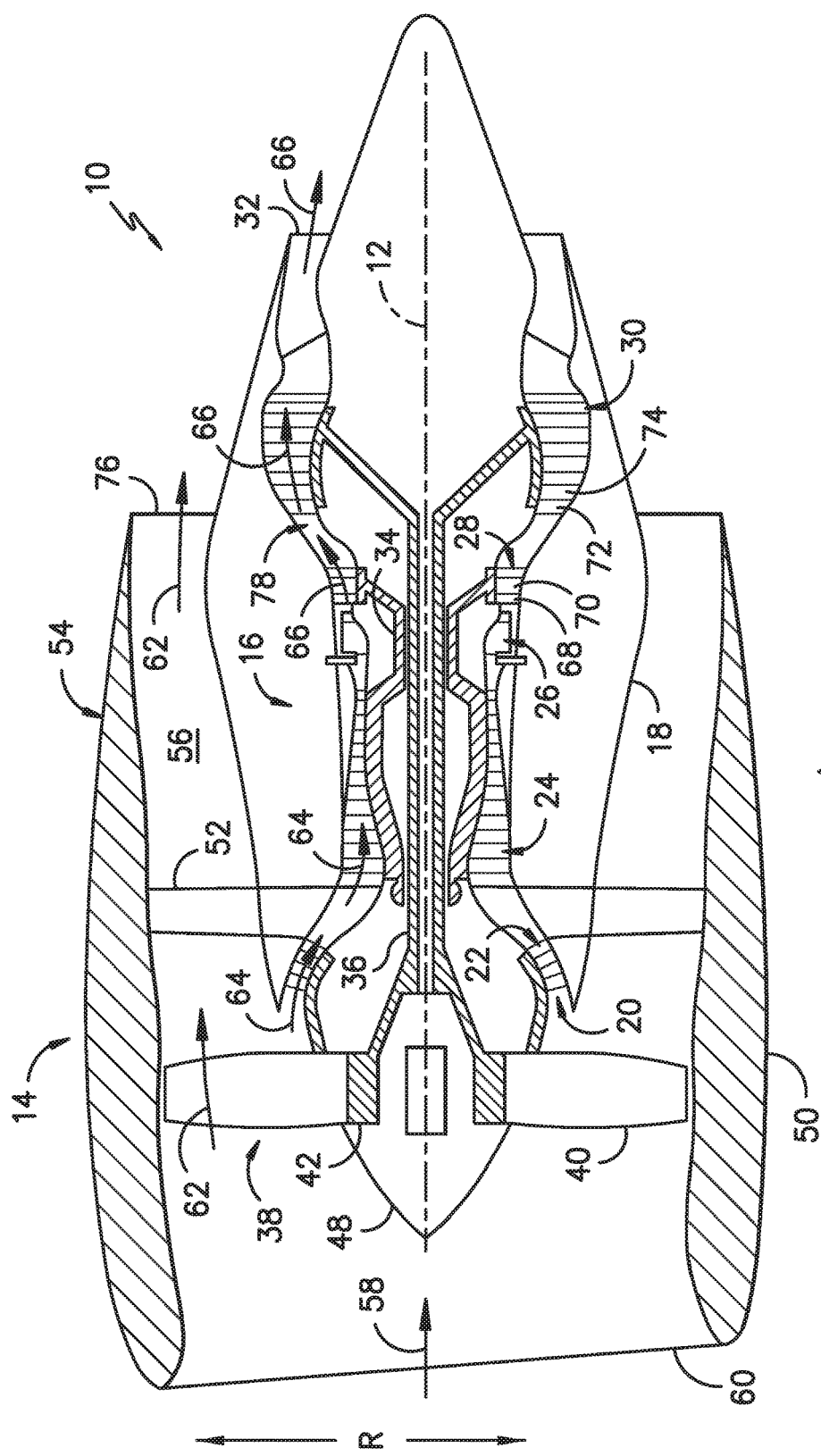
FIG. -1-

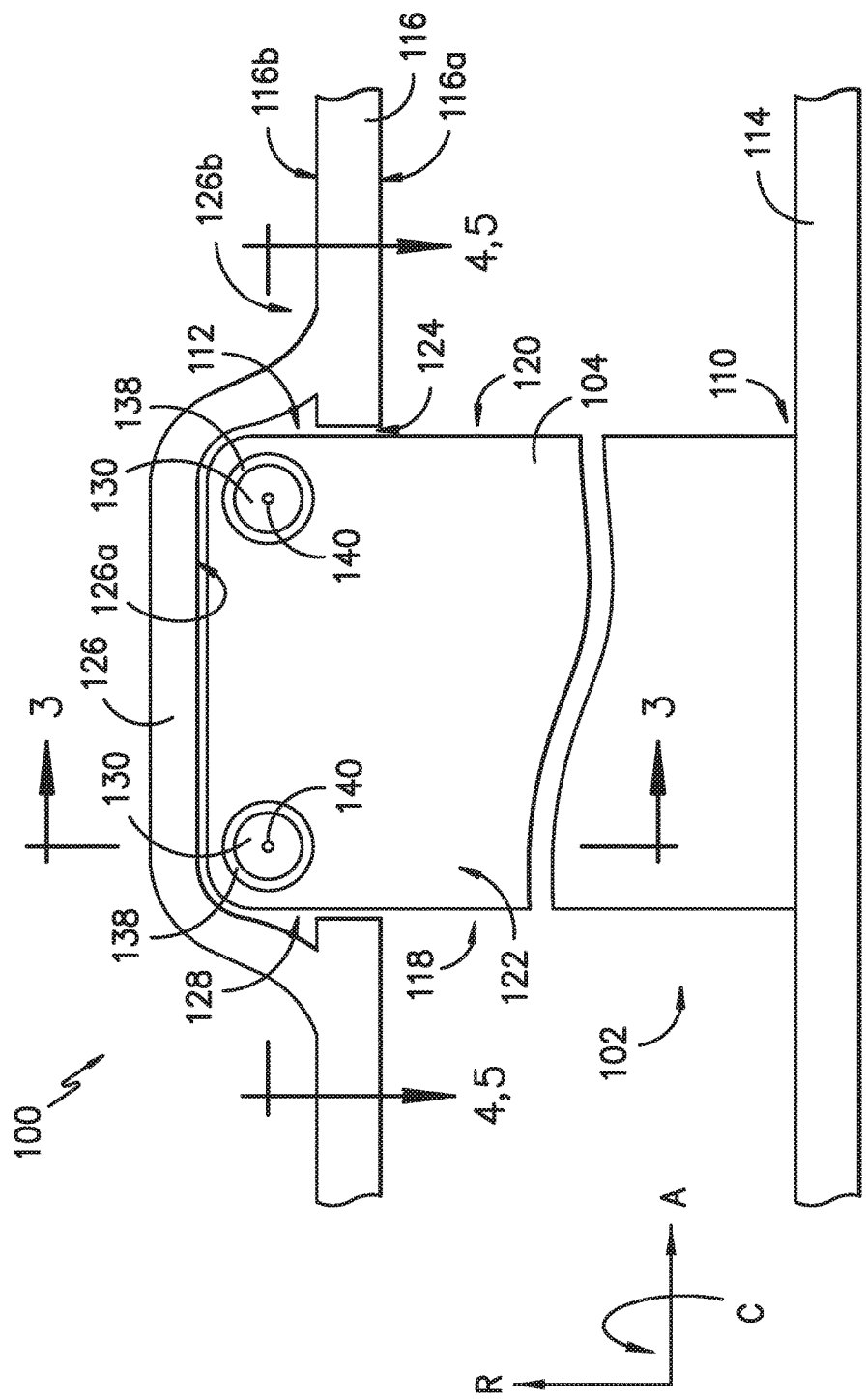
FIG. -2-

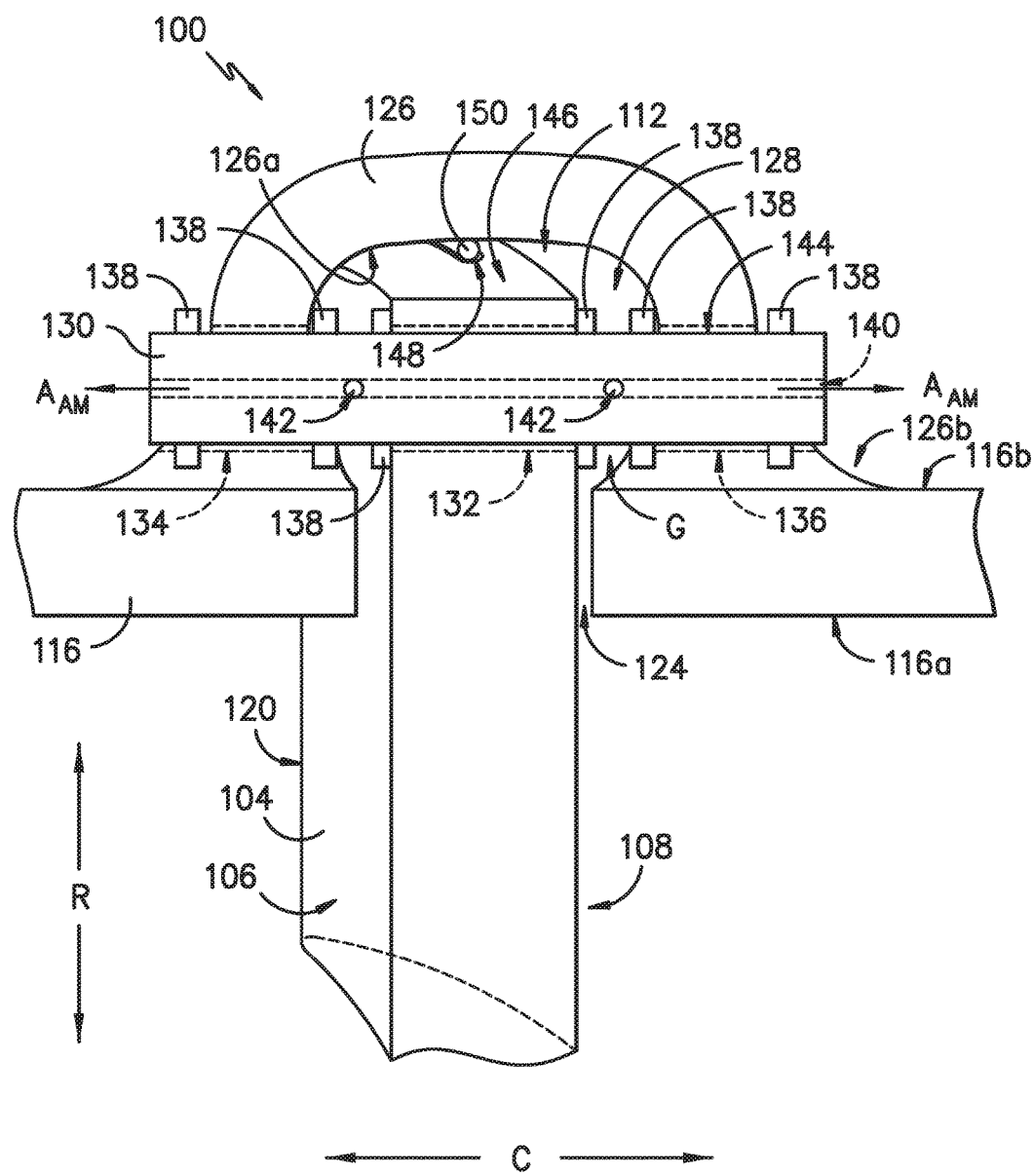
FIG. -3-

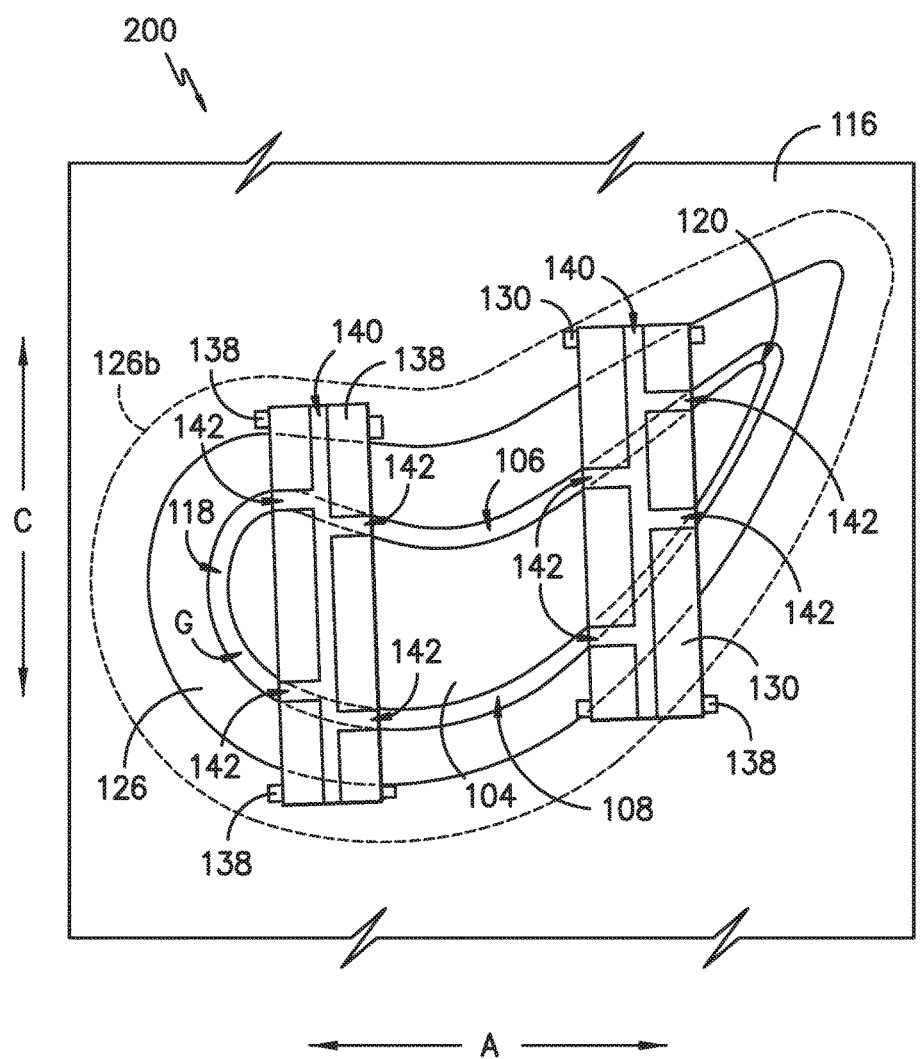
FIG. -4-

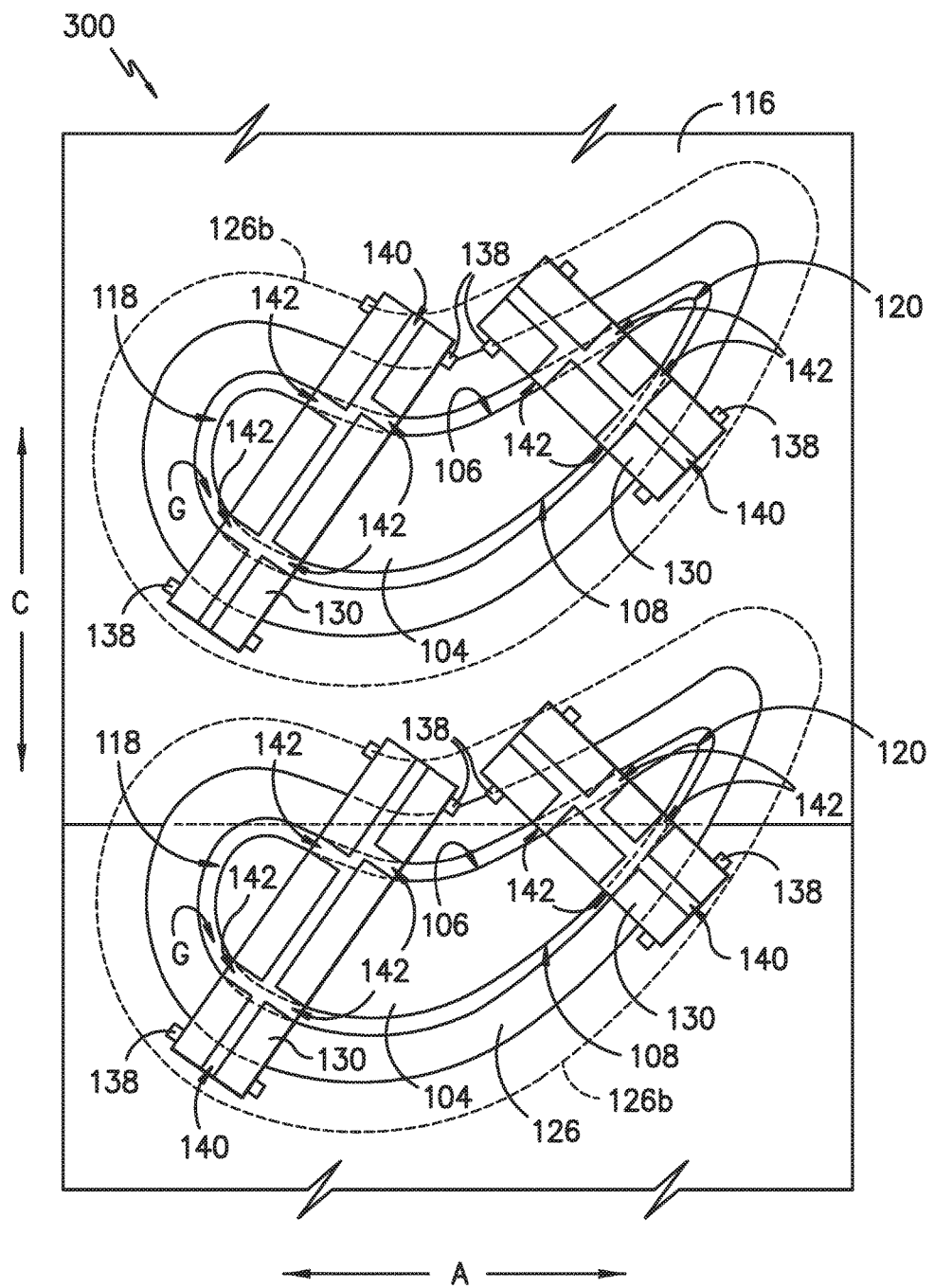
FIG. -5-

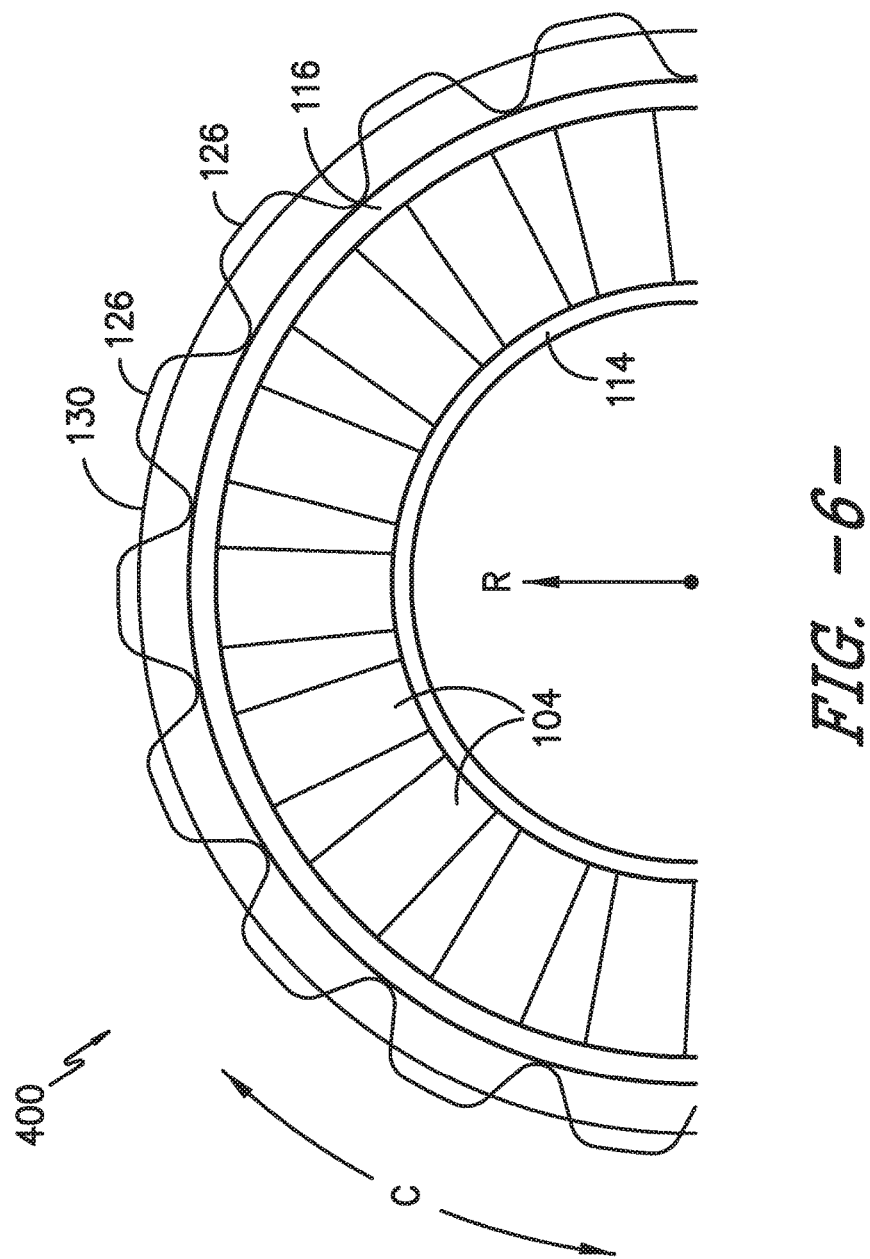
FIG. -6-

NOZZLE AIRFOIL DECOUPLED FROM AND ATTACHED OUTSIDE OF FLOW PATH BOUNDARY

FIELD

The present subject matter relates generally to flow path assemblies defining a path for fluid flow. More particularly, the present subject matter relates to flow path assemblies of gas turbine engines and, most particularly, to nozzle airfoils decoupled from and attached outside of the flow path boundary.

BACKGROUND

More commonly, non-traditional high temperature composite materials, such as ceramic matrix composite (CMC) materials, are being used in applications such as gas turbine engines. Components fabricated from CMC materials have a higher temperature capability compared with typical components, e.g., metal components, which may allow improved component performance and/or increased engine temperatures. Generally, a gas turbine engine includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

More particularly, the gas turbine engine defines a flow path for routing the combustion gases through the engine. Typically, a plurality of nozzle airfoils (or stator vanes) and rotor blade airfoils (or rotor blades) extend within the flow path for extracting kinetic energy from the flow of combustion gases. Commonly, the nozzle airfoils are bonded to or integral with the flow path boundary walls, such that forces or loads on the nozzle airfoils are transferred to the flow path boundary walls at the bonded connection or the transition between the nozzle airfoils and the walls. As such, stress concentrations arise at the bonded connection or transition between the nozzle airfoils and the walls, particularly at the leading and trailing edges of the airfoils. Often, these stresses exceed the material capability of CMC materials, which may discourage the use of CMC materials despite their benefits.

Accordingly, improved flow path assemblies utilizing CMC materials would be desirable. For instance, a flow path assembly including nozzle airfoils that are decoupled from a flow path boundary wall, such that the loads or forces on the nozzle airfoils are transferred through a structure other than the boundary wall, would be beneficial. As another example, a flow path assembly including features for controlling or metering the cooling or purge flow to components of the flow path assembly would be useful.

BRIEF DESCRIPTION

Aspects and advantages of the invention will be set forth in part in the following description, or may be obvious from the description, or may be learned through practice of the invention.

In one exemplary embodiment of the present subject matter, a flow path assembly for a gas turbine engine is provided. The flow path assembly defines a flow path through the gas turbine engine, as well as an axial direction and a radial direction that are orthogonal to one another and a circumferential direction extending about the axial direction. The flow path assembly comprises a nozzle airfoil having a first end opposite a second end and a wall defining a flow path boundary. The wall has an opening therein through which the second end of the nozzle airfoil protrudes such that the second end of the nozzle airfoil extends outside of the flow path. The flow path assembly further comprises a cap extending over the second end of the nozzle airfoil and an attachment member extending through the second end of the nozzle airfoil and the cap to attach the second end of the nozzle airfoil to the cap.

In another exemplary embodiment of the present subject matter, a flow path assembly for a gas turbine engine is provided. The flow path assembly defines a flow path through the gas turbine engine, as well as an axial direction and a radial direction that are orthogonal to one another and a circumferential direction extending about the axial direction. The flow path assembly comprises a plurality of nozzle airfoils, each nozzle airfoil having a first end opposite a second end. The flow path assembly also comprises a wall defining a flow path boundary and having a plurality of openings therein. The second end of each nozzle airfoil protrudes through one of the plurality of openings such that the second end of each nozzle airfoil extends outside of the flow path. The flow path assembly further comprises a plurality of caps. One cap of the plurality of caps extends over the second end of one nozzle airfoil of the plurality of nozzle airfoils such that a separate cap extends over the second end of each nozzle airfoil. Moreover, the flow path assembly comprises a plurality of attachment members, and at least one attachment member of the plurality of attachment members extends through the second end of each nozzle airfoil and its respective cap to attach the second end of each nozzle airfoil to its respective cap.

In a further exemplary embodiment of the present subject matter, a flow path assembly for a gas turbine engine is provided. The flow path assembly defines a flow path through the gas turbine engine, as well as an axial direction and a radial direction that are orthogonal to one another and a circumferential direction extending about the axial direction. The flow path assembly comprises a turbine nozzle segment. The turbine nozzle segment includes a plurality of nozzle airfoils, and each nozzle airfoil having a first end opposite a second end. The turbine nozzle segment further includes a wall defining a flow path boundary. The wall has a plurality of openings therein, and the second end of each nozzle airfoil protrudes through one of the plurality of openings such that the second end of each nozzle airfoil extends outside of the flow path. The turbine nozzle segment also includes a plurality of caps. One cap of the plurality of caps extending over the second end of one nozzle airfoil of the plurality of nozzle airfoils such that a separate cap extends over the second end of each nozzle airfoil. Moreover, the turbine nozzle segment includes an airfoil aperture defined in the second end of each nozzle airfoil; a first cap aperture and a second cap aperture defined in each cap; and an attachment member. The airfoil apertures, first cap apertures, and second cap apertures are defined on an arc, and the attachment member extends along the arc such that the attachment member is received in the airfoil apertures, first cap apertures, and second cap apertures.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a schematic cross-section view of a flow path assembly of the gas turbine engine of FIG. 1, according to an exemplary embodiment of the present subject matter.

FIG. 3 provides a schematic cross-section view of the flow path assembly of FIG. 2, taken along the line 3-3 of FIG. 2, according to an exemplary embodiment of the present subject matter.

FIG. 4 provides a schematic cross-section view of the flow path assembly of FIG. 2, taken along the line 4-4 of FIG. 2, according to an exemplary embodiment of the present subject matter.

FIG. 5 provides a schematic cross-section view of the flow path assembly of FIG. 2, taken along the line 5-5 of FIG. 2, according to an exemplary embodiment of the present subject matter.

FIG. 6 provides a schematic cross-section view of a turbine nozzle segment of the flow path assembly of FIG. 2 according to an exemplary embodiment of the present subject matter.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

FIG. 2 provides a schematic cross-section view of a flow path assembly of the engine 10. FIG. 3 provides a schematic cross-section view of the flow path assembly of FIG. 2, taken along the line 3-3 of FIG. 2. As shown in FIGS. 2 and 3, the flow path assembly 100 defines a flow path 102, e.g., a flow path 102 through the gas turbine engine 16 such as the hot gas path 78. The flow path assembly 100 defines an axial direction A and a radial direction R that are orthogonal to one another, as well as a circumferential direction C that extends about the axial direction A.

As illustrated in FIGS. 2 and 3, the flow path assembly 100 comprises a nozzle airfoil 104, which, e.g., may be one of the HP turbine stator vanes 68 described above. The airfoil 104 has a concave pressure side 106 opposite a convex suction side 108. Opposite pressure and suction sides 106, 108 of the airfoil 104 radially extend along an airfoil span S between a first end 110 opposite a second end 112. The first end 110 is positioned at an inner wall 114 of the flow path assembly 100, and the second end 112 is positioned at or near an outer wall 116 of the assembly 100. Moreover, pressure and suction sides 106, 108 of the airfoil 104 axially extend between a leading edge 118 and an opposite trailing edge 120. Further, the pressure and suction sides 106, 108 define an outer surface 122 of the airfoil 104.

The inner wall 114 of the flow path assembly 100 defines an inner boundary of the flow path 102, and the outer wall 116 defines an outer boundary of the flow path 102. In the exemplary embodiment shown in FIGS. 2 and 3, the outer wall 116 has an opening 124 therein through which the second end 112 of the nozzle airfoil 104 protrudes or extends. As such, the second end 112 of the airfoil 104 extends outside of the flow path 102 and is not integral with, bonded to, or otherwise coupled to the outer wall 116 but, rather, is decoupled from the outer wall 116. In other embodiments, the inner end 110 of the airfoil 104 similarly may protrude or extend through an opening in the inner wall 114 such that the inner end 110 extends outside of the flow path 102 and is not coupled to, but is decoupled from, the inner wall 114. In some embodiments, only one of the inner end 110 and the outer end 112 may extend outside of the flow path 102, but in other embodiments, both ends 110, 112 may extend outside of the flow path 102 such that the airfoil 104 is decoupled from both the inner and outer flow path boundaries.

As depicted in FIGS. 2 and 3, a cap 126 extends over the second end 112 of the nozzle airfoil 104 that is protruding through opening 124 in the outer wall 116. The cap 126 encloses the second end 112 of the airfoil 104 within a cavity 128 defined by the cap 126, e.g., to help control leakage from and to the flow path 102 around the nozzle airfoil 104 extending through the outer wall 116. Preferably, the cap 126 is integral with the outer wall 116, i.e., the cap 126 and wall 116 are formed as a single unitary structure. In other embodiments, the cap 126 may be bonded or otherwise coupled to the outer wall 116. Integrating the cap 126 with the outer wall 116, or coupling the cap 126 to the outer wall 116, helps prevent leakage around the second end 112 of airfoil 104 and through the opening 124 in the outer wall 116. For example, as shown in FIGS. 2 and 3, the outer wall 116 has an inner surface 116a facing the flow path 102 and an opposite outer surface 116b facing away from and spaced apart from the flow path 102. The cap 126 is joined to the outer surface 116b of the outer wall 116 along an edge or fillet 126b, e.g., by integrating the cap 126 and wall 116 or bonding or the like, such that the cap 126 closes off the second end 112 of the airfoil 104. However, in other embodiments, the cap 126 may be open, e.g., to allow cooling or purge flow through the cap 126. Whether the cap 126 is open or closed may depend on the cooling or purge needs of the system.

Further, the cap 126 has an inner surface 126a facing the second end 112 of the nozzle airfoil 104. As shown in FIGS. 2 and 3, a gap G is defined between the outer surface 122 of the airfoil 104 and the inner surface 126a of the cap 126. Some fluid flowing through the flow path 102 may flow through the opening 124 in outer wall 116 and into the gap G. As will be described in greater detail below, the flow path assembly 100 may include one or more features for preventing such fluid, e.g., from flowing outside of the cap as flow path leakage and/or from flowing from the pressure side 106 to the suction side 108 of airfoil 104 as cross-over leakage.

One or more attachment members 130 extend through apertures in the nozzle airfoil 104 and the cap 126 to attach the second end 112 of the airfoil 104 to the cap 126. The attachment members 130 may be pins, bolts, or other suitable fasteners for attaching the airfoils 104 to the caps 126. More particularly, referring to FIG. 3, the airfoil second end 112 defines at least one airfoil aperture 132, and the cap 126 defines a first cap aperture 134 and a second cap aperture 136 that align with the airfoil aperture 132 to receive an attachment member 130. It will be appreciated that, in embodiments in which the airfoil second end 112 defines more than one airfoil aperture 132, the cap 126 likewise defines more than one first cap aperture 134 and more than one second cap aperture 136. In such embodiments, a first and a second cap aperture 134, 136 are defined for each airfoil aperture 132 such that an attachment member 130 may be received through each first cap aperture 134, airfoil aperture 132, and second cap aperture 136 to attach the airfoil 104 to the cap 126. For example, in the embodiment illustrated in FIG. 2, two attachment members 130 are used to attach the airfoil 104 to the cap 126, with each attachment member 130 extending through the second end 112 of the airfoil 104 and the cap 126 to attach the airfoil 104 to the cap 126. As such, the second end 112 of the nozzle airfoil 104 defines two airfoil apertures 132, and the cap 126 defines two first cap apertures 134 and two second cap apertures 136, one first cap aperture 134 and second cap aperture 136 corresponding to each airfoil aperture 132.

The attachment members 130 may be retained in the apertures 132, 134, 136 using a variety of mechanisms. For instance, a lock wire may be wrapped around adjacent ends of the attachment members 130 used to attach an airfoil 104 to its respective cap 126, such that the lock wire extends between the attachment members 130 and discourages the attachments members 130 from working out of the apertures 132, 134, 136. In another embodiment, the attachment members 130 may be welded or otherwise coupled to grommets 138 (described in greater detail below), which help retain the attachment members 130 in the apertures 132, 134, 136. In still another embodiment, each attachment member 130 may have a head, such as a D-shaped head, or other feature on one end that mates with a complementary feature in the cap 126 to help prevent the attachment members 130 from retracting from or working their way out of the apertures 132, 134, 136. Additionally, in such embodiments, the other end of the attachment members 130 may be brazed to the cap 126 to also help retain the attachment members 130 in the apertures.

It will be appreciated that, preferably, each airfoil aperture 132 and its respective cap apertures 134, 136 are precisely aligned to minimize leakage and relative motion between the airfoil 104 and cap 126. Moreover, as explained in greater detail below, the airfoil 104 and cap 126 may be formed from the same material, such as a CMC material, to minimize differential thermal growth between these components, i.e., because the airfoil 104 and cap 126 have substantially the same coefficient of thermal expansion (CTE). In some embodiments, the attachment members 130 also may be formed from the same material as the airfoil 104 and cap 126, such as a CMC material, to minimize deferential thermal growth between the airfoil 104, cap 126, and attachment members 130. In other embodiments, however, the attachment members 130 may be formed from a different material, such as a metal or metal alloy, that has a different CTE from the airfoil 104 and cap 126. In such embodiments, the attachment members 130 may have a controlled cooling mechanism to minimize the CTE mismatch between the attachment members 130 and the airfoil 104 and cap 126.

As further illustrated in FIGS. 2 and 3, a plurality of grommets 138 may be used, e.g., to help prevent leakage around the attachment members 130. In the illustrated embodiment, a grommet 138 is positioned at each airfoil aperture 132, first cap aperture 134, and second cap aperture 136. More specifically, a grommet 138 is positioned on each side or end of each aperture 132, 134, 136. However, in other embodiments, a grommet 138 may be included on only one side or end of each aperture 132, 134, 136, or any other suitable number and configuration of grommets 138 may be used. Also, the grommets 138 are optional, and in some embodiments, may be omitted.

Continuing with the exemplary embodiment of FIGS. 2 and 3, each attachment member 130 defines an internal cooling passage 140 extending along an axis $A_{AM}$ of the attachment member 130. In other embodiments, the internal cooling passage 140 may extend through the attachment member 130 in other ways, e.g., in a generally helical configuration or in any other suitable configuration. Further, referring particularly to FIG. 3, each attachment member 130 may define one or more flow passages 142, which each extend from the internal cooling passage 140 to an external surface 144 of the attachment member 130. The internal cooling passage 140 and flow passages 142 provide a controlled cooling path through the attachment member 130. That is, cooler, higher pressure fluid flowing outside of the flow path 102 may flow through the internal cooling passage 140 through the attachment member 130, e.g., to cool the attachment member 130, as well as the cap 126 and second end 112 of the airfoil 104 through which the attachment member 130 passes. Moreover, the flow passage(s) 142 branching from the internal cooling passage 140 may provide the cooler fluid flow, e.g., to the gap G between the cap 126 and airfoil 104 as shown in FIG. 3 to cool or purge the space between the cap 126 and airfoil 104. The internal cooling passage 140 and flow passage(s) 142 may be sized to meter the flow through the passages, e.g., to control the cooling, purge, or leakage through the passages 140, 142.

As further illustrated in FIG. 3, the second end 112 of the airfoil 104 defines a tip end 146 of the airfoil 104. The tip end 146 is the radially outermost surface of the airfoil 104. As shown in FIG. 3, a groove 148 is defined in the tip end 146, and a seal 150 is positioned in the groove 148 to provide a seal between the cap inner surface 126a and the airfoil 104 at the tip end 146. More particularly, the seal 150 may be included in the flow path assembly 100, e.g., to prevent cross-over leakage from the pressure side 106 to the suction side 108 of the airfoil 104. Such cross-over leakage, from the pressure side 106, which is at a higher pressure, to the suction side 108, which is at a lower pressure, can negatively impact engine performance. Therefore, the seal 150 may be included to minimize and/or prevent such leakage.

Although FIGS. 2 and 3 are described with respect to a single nozzle airfoil 104, it will be appreciated that a plurality of nozzle airfoils 104, spaced apart from one another along the circumferential direction C, form a turbine nozzle assembly. A turbine nozzle assembly, comprising a ring of nozzle airfoils 104 extending within a flow path 102 defined by an inner wall 114 and an outer wall 116, makes up a turbine nozzle stage of a turbine section, such as the HP turbine section 28 or the LP turbine section 30 previously described. Thus, with respect to the embodiment illustrated in FIGS. 2 and 3, the flow path assembly 100 includes a plurality of nozzle airfoils 104, with a second end 112 of each airfoil 104 extending through an opening 124 of a plurality of openings 124 in the outer wall 116 of the flow path assembly 100 such that the second end 112 of each airfoil 104 extends outside of the flow path 102. The nozzle airfoils 104, the inner wall 114, and the outer wall 116 are configured as previously described. Further, the flow path assembly 100 includes a plurality of caps 126 such that the second end 112 of each airfoil 104 is covered by its own cap 126. That is, one cap 126 of the plurality of caps 126 extends over the second end 112 of one nozzle airfoil 104 of the plurality of airfoils 104 such that a separate cap 126 extends over the second end 112 of each airfoil 104. The caps 126 are configured as described above. Moreover, the flow path assembly 100 includes a plurality of attachment members 130 for attaching the second end 112 of each airfoil 104 to its respective cap 126. More particularly, at least one attachment member 130 of the plurality of attachment members 130 extends through the second end 112 of each airfoil 104 and its respective cap 126 to attach the second end 112 of each airfoil 104 to its respective cap 126. In an exemplary embodiment, as shown in FIG. 2, two attachment members 130 extend through the second end 112 of each airfoil 104 and its respective cap 126 to attach the second end 112 to the cap 126. Each attachment member 130 of the plurality of attachment members 130 is configured as previously described, and the second end 112 of each airfoil 104 defines at least one airfoil aperture 132 and each cap 126 defines at least one first cap aperture 134 and at least one second cap aperture 136 for receipt of an attachment member 130 as described above. Additionally, in some embodiments, the tip end 146 of each airfoil 104 defines a groove 148 for receipt of a seal 150 to provide a seal between the airfoil 104 and its respective cap 126.

Turning now to FIGS. 4 and 5, the plurality of airfoils 104 may be arranged in a variety of configurations. Referring particularly to FIG. 4, a schematic cross-section view is provided of the flow path assembly of FIG. 2, taken along the line 4-4 of FIG. 2. More particularly, FIG. 4 provides a top, cross-section view of a singlet turbine nozzle segment 200, i.e., a segment of a turbine nozzle assembly having a single nozzle airfoil 104, according to an exemplary embodiment of the present subject matter. It will be appreciated that a plurality of segments 200 form a turbine nozzle assembly, which defines at least a portion of a flow path assembly 100, as previously described. As shown in FIG. 4, the singlet segment 200 has sufficient spacing between airfoils 104 to allow the attachment members 130 to extend generally along the circumferential direction C. That is, the plurality of airfoils 104 and their respective caps 126, the edge or fillet 126b of which is shown in a dashed line, are sufficiently spaced apart that the attachment members 130 may be aligned generally along the circumferential direction C while allowing for insertion and removal of the attachment members 130 from the flow path assembly 100. As further illustrated in FIG. 4, and as described above, the flow passages 142 in each attachment member 130 may be defined to generally align with the gap G between the respective cap 126 and airfoil 104 when the attachment member 130 is inserted into its respective apertures 132, 134, 136.

Referring now to FIG. 5, a schematic cross-section view is provided of the flow path assembly of FIG. 2, taken along the line 5-5 of FIG. 2. More specifically, FIG. 5 provides a top, cross-section view of a doublet turbine nozzle segment 300, i.e., a segment of a turbine nozzle assembly having two nozzle airfoils 104, according to another exemplary embodiment of the present subject matter. Like the singlet segments 200, a plurality of the doublet segments 300 may be used to form a turbine nozzle assembly, and in turn at least a portion of a flow path assembly 100, as previously described. However, unlike the singlet segments 200, the doublet segments 300 lack sufficient spacing between the nozzle airfoils 104 to align the attachment members 130 generally along the circumferential direction C. Rather, as illustrated in FIG. 5, each of the plurality of attachment members 130 is skewed with respect to the axial and circumferential directions A, C. That is, to facilitate insertion of the attachment members 130 into the respective apertures 132, 134, 136 and removal of the attachment members 130 from the apertures 132, 134, 136, the attachment members 130 are offset from the axial direction A and the circumferential C. As shown in FIG. 5, by offsetting or skewing the attachment members 130, the cap 126 of one airfoil 104 does not block the attachment member apertures 132, 134, 136 of an adjacent cap 126 and airfoil 104. Offset or skewed attachment members 130 may be used for any turbine nozzle segment or assembly lacking sufficient spacing between nozzle airfoils 104 to allow the attachment members 130 to extend generally along the circumferential direction C. For example, the skewed or offset configuration of attachment members 130 depicted in FIG. 5 may be used for doublet, triplet, or any turbine nozzle segments having more than one airfoil 104. The skewed or offset attachment member configuration also may be used for single piece turbine nozzle assemblies having, e.g., single piece inner and outer walls 114, 116.

Turning now to FIG. 6, a schematic cross-section view is provided of a turbine nozzle segment 400 according to an exemplary embodiment of the present subject matter. As described with respect to FIG. 5, the attachment members 130 may have to be offset or skewed for turbine nozzle segments having more than one nozzle airfoil 104. However, as illustrated schematically in FIG. 6, in some embodiments comprising turbine nozzle segments 400 spanning up to 180°, the attachment members 130 could extend generally along the circumferential direction C if the airfoil apertures 132, first cap apertures 134, and second cap apertures 136 were defined on an arc, and the attachment members 130 were arcing rods, i.e., rods extending along the arc. As shown in FIG. 6, a single attachment member 130 extends through multiple apertures 132, 134, 136 defined through adjacent airfoils 104. The turbine nozzle segment 400 may be an approximately 180° segment as shown in FIG. 6, such that two turbine nozzle segments 400 are used to form the turbine nozzle assembly of the flow path assembly 100. In other embodiments, the turbine nozzle segment 400 may be less than 180°, e.g., the turbine nozzle assembly may comprise three 120° turbine nozzle segments 400.

As previously described, the attachment members 130 may be formed from a metallic material, such as a metal or metal alloy, and the internal cooling passage 140 and flow passages 142 may be used to cool the attachment members 130 and minimize the impacts of any deferential thermal growth between the attachment members 130, airfoils 104, and caps 126. In other embodiments, the attachment members 130 may be formed from a ceramic matrix composite (CMC) material, which is a non-metallic material having high temperature capability. The airfoils 104 and the caps 126 preferably also are formed from a CMC material. As described above, the airfoils 104 may be turbine nozzle airfoils located within the hot gas path 78, where it may be particularly useful to utilize CMC materials due to the relatively high temperatures of the combustion gases 66. However, other components of turbofan engine 10, such as components of HP compressor 24, also may comprise a CMC material. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

More specifically, examples of CMC materials, and particularly SiC/Si—SiC (fiber/matrix) continuous fiber-reinforced ceramic composite (CFCC) materials and processes, are described in U.S. Pat. Nos. 5,015,540; 5,330,854; 5,336,350; 5,628,938; 6,024,898; 6,258,737; 6,403,158; and 6,503,441, and U.S. Patent Application Publication No. 2004/0067316. Such processes generally entail the fabrication of CMCs using multiple pre-impregnated (prepreg) layers, e.g., the ply material may include prepreg material consisting of ceramic fibers, woven or braided ceramic fiber cloth, or stacked ceramic fiber tows that has been impregnated with matrix material. In some embodiments, each prepreg layer is in the form of a "tape" comprising the desired ceramic fiber reinforcement material, one or more precursors of the CMC matrix material, and organic resin binders. Prepreg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the flexibility of prepreg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix. Chopped fibers or whiskers or other materials also may be embedded within the matrix as previously described. Other compositions and processes for producing composite articles, and more specifically, other slurry and prepreg tape compositions, may be used as well, such as, e.g., the processes and compositions described in U.S. Patent Application Publication No. 2013/0157037.

The resulting prepreg tape may be laid-up with other tapes, such that a CMC component formed from the tape comprises multiple laminae, each lamina derived from an individual prepreg tape. Each lamina contains a ceramic fiber reinforcement material encased in a ceramic matrix formed, wholly or in part, by conversion of a ceramic matrix precursor, e.g., during firing and densification cycles as described more fully below. In some embodiments, the reinforcement material is in the form of unidirectional arrays of tows, each tow containing continuous fibers or filaments. Alternatives to unidirectional arrays of tows may be used as well. Further, suitable fiber diameters, tow diameters, and center-to-center tow spacing will depend on the particular application, the thicknesses of the particular lamina and the tape from which it was formed, and other factors. As described above, other prepreg materials or non-prepreg materials may be used as well.

After laying up the tapes or plies to form a layup, the layup is debulked and, if appropriate, cured while subjected to elevated pressures and temperatures to produce a preform. The preform is then heated (fired) in a vacuum or inert atmosphere to decompose the binders, remove the solvents, and convert the precursor to the desired ceramic matrix material. Due to decomposition of the binders, the result is a porous CMC body that may undergo densification, e.g., melt infiltration (MI), to fill the porosity and yield the CMC component. Specific processing techniques and parameters for the above process will depend on the particular composition of the materials. For example, silicon CMC components may be formed from fibrous material that is infiltrated with molten silicon, e.g., through a process typically referred to as the Silcomp process. Another technique of manufacturing CMC components is the method known as the slurry cast melt infiltration (MI) process. In one method of manufacturing using the slurry cast MI method, CMCs are produced by initially providing plies of balanced two-dimensional (2D) woven cloth comprising silicon carbide (SiC)-containing fibers, having two weave directions at substantially 90° angles to each other, with substantially the same number of fibers running in both directions of the weave. The term "silicon carbide-containing fiber" refers to a fiber having a composition that includes silicon carbide, and preferably is substantially silicon carbide. For instance, the fiber may have a silicon carbide core surrounded with carbon, or in the reverse, the fiber may have a carbon core surrounded by or encapsulated with silicon carbide.

Other techniques for forming CMC components include polymer infiltration and pyrolysis (PIP) and oxide/oxide processes. In PIP processes, silicon carbide fiber preforms are infiltrated with a preceramic polymer, such as polysilazane and then heat treated to form a SiC matrix. In oxide/oxide processing, aluminum or alumino-silicate fibers may be pre-impregnated and then laminated into a preselected geometry. Components may also be fabricated from a carbon fiber reinforced silicon carbide matrix (C/SiC) CMC. The C/SiC processing includes a carbon fibrous preform laid up on a tool in the preselected geometry. As utilized in the slurry cast method for SiC/SiC, the tool is made up of graphite material. The fibrous preform is supported by the tooling during a chemical vapor infiltration process at about 1200° C., whereby the C/SiC CMC component is formed. In still other embodiments, 2D, 2.5D, and/or 3D preforms may be utilized in MI, CVI, PIP, or other processes. For example, cut layers of 2D woven fabrics may be stacked in alternating weave directions as described above, or filaments may be wound or braided and combined with 3D weaving, stitching, or needling to form 2.5D or 3D preforms having multiaxial fiber architectures. Other ways of forming 2.5D or 3D preforms, e.g., using other weaving or braiding methods or utilizing 2D fabrics, may be used as well.

Thus, a variety of processes may be used to form CMC airfoils 104, CMC caps 126, and, in some embodiments, CMC attachment members 130. Further, by decoupling the airfoils 104 from the flow path boundary as previously described, the stress concentration between the airfoil 104 and the inner and/or outer wall 114, 116 is eliminated. That is, typical flow path assemblies utilize a bonded connection between the airfoil and the inner and/or outer wall, which results in a stress concentration between the airfoil fillet and the wall due to the bending, thermal, and/or other loads or forces on the airfoil. In the configurations described herein, the bending loads, thermal loads, and/or other loads or forces are transferred from the airfoils 104 to the caps 126 through the attachment members 130, thereby eliminating the stress concentration between the airfoil and the flow path boundary wall. Additionally, the airfoil 104, cap 126, and attachment member 130 embodiments described herein allow individual airfoils 104 to be assembled and/or disassembled with respect to the flow path assembly 100.

Moreover, the subject matter described herein allows controlled cooling or purge flow within the flow path assembly 100. For instance, the sealing surfaces in the embodiments described herein are between the attachment members 130 and caps 126 and between the caps 126 and the inner and/or outer wall 114, 116. As described, the attachment members 130 may have an internal cooling passage 140 and, in some embodiments, one or more flow passages 142 that meter the cooling or purge flow to the flow path assembly 100. In some embodiments, the cooling flow needed may be only a sufficient flow to cool the attachment members 130 or a precisely metered flow to the gaps G, which may be less cooling or purge flow than is typically used at airfoil to flow path boundary interfaces, thereby providing a performance benefit over other designs. Of course, other advantages of the present subject matter also may occur to those of ordinary skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A flow path assembly for a gas turbine engine, the flow path assembly defining a flow path through the gas turbine engine, the flow path assembly defining an axial direction and a radial direction that are orthogonal to one another, the flow path assembly further defining a circumferential direction extending about the axial direction, the flow path assembly comprising:
    a nozzle airfoil having a first end opposite a second end;
    a wall defining a flow path boundary, the wall having an opening therein through which the second end of the nozzle airfoil protrudes such that the second end of the nozzle airfoil extends outside of the flow path;
    a cap extending over the second end of the nozzle airfoil; and
    an attachment member extending through the second end of the nozzle airfoil and the cap to attach the second end of the nozzle airfoil to the cap.

2. The flow path assembly of claim 1, wherein the wall has an inner surface facing the flow path and an opposite outer surface, wherein the cap is integral with the outer surface of the wall.

3. The flow path assembly of claim 1, wherein the wall has an inner surface facing the flow path and an opposite outer surface, wherein the cap is joined to the outer surface of the wall.

4. The flow path assembly of claim 1, wherein the attachment member defines an internal cooling passage extending through the attachment member.

5. The flow path assembly of claim 4, wherein the attachment member defines a flow passage extending from the internal cooling passage to an external surface of the attachment member.

6. The flow path assembly of claim 5, wherein the attachment member is formed from a metallic material.

7. The flow path assembly of claim 1, wherein the flow path assembly comprises two attachment members, each attachment member extending through the second end of the nozzle airfoil and the cap to attach the second end of the nozzle airfoil to the cap, each attachment member extending generally along the circumferential direction.

8. The flow path assembly of claim 1, wherein the second end of the nozzle airfoil defines an airfoil aperture for receipt of the attachment member, wherein the cap defines a first cap aperture and a second cap aperture for receipt of the attachment member.

9. The flow path assembly of claim 1, wherein the nozzle airfoil has a pressure side and a suction side that define an outer surface of the nozzle airfoil, wherein the cap has an inner surface facing the second end of the nozzle airfoil, and wherein a gap is defined between the outer surface of the nozzle airfoil and the inner surface of the cap.

10. The flow path assembly of claim 1, wherein the nozzle airfoil and the cap are formed from a ceramic matrix composite (CMC) material.

11. The flow path assembly of claim 1, wherein the attachment member is formed from a CMC material.

12. A flow path assembly for a gas turbine engine, the flow path assembly defining a flow path through the gas turbine engine, the flow path assembly defining an axial direction and a radial direction that are orthogonal to one another, the flow path assembly further defining a circumferential direction extending about the axial direction, the flow path assembly comprising:
    a plurality of nozzle airfoils, each nozzle airfoil having a first end opposite a second end;
    a wall defining a flow path boundary, the wall having a plurality of openings therein, the second end of each nozzle airfoil protruding through one of the plurality of openings such that the second end of each nozzle airfoil extends outside of the flow path;
    a plurality of caps, one cap of the plurality of caps extending over the second end of one nozzle airfoil of the plurality of nozzle airfoils such that a separate cap extends over the second end of each nozzle airfoil; and
    a plurality of attachment members, at least one attachment member of the plurality of attachment members extending through the second end of each nozzle airfoil and its respective cap to attach the second end of each nozzle airfoil to its respective cap.

13. The flow path assembly of claim 12, wherein each nozzle airfoil of the plurality of nozzle airfoils is decoupled from the wall.

14. The flow path assembly of claim 12, wherein each of the plurality of attachment members is skewed with respect to the axial and circumferential directions.

15. The flow path assembly of claim 12, wherein each attachment member of the plurality of attachment members defines an internal cooling passage extending through the attachment member.

16. The flow path assembly of claim 15, wherein each attachment member of the plurality of attachment members defines a flow passage extending from the internal cooling passage to an external surface of the attachment member.

17. The flow path assembly of claim 12, wherein the second end of each nozzle airfoil defines an airfoil aperture for receipt of one of the plurality of attachment members, wherein each cap defines a first cap aperture and a second cap aperture for receipt of one of the plurality of attachment members, and wherein a grommet is positioned at each first cap aperture and second cap aperture.

18. The flow path assembly of claim 12, wherein each nozzle airfoil has a tip end, and wherein a seal is positioned between the tip end of each nozzle airfoil and its respective cap.

19. The flow path assembly of claim 12, wherein the nozzle airfoil, the wall, and the cap are formed from a ceramic matrix composite (CMC) material.

20. A flow path assembly for a gas turbine engine, the flow path assembly defining a flow path through the gas turbine engine, the flow path assembly defining an axial direction and a radial direction that are orthogonal to one another, the flow path assembly further defining a circumferential direction extending about the axial direction, the flow path assembly comprising:

a turbine nozzle segment including
  a plurality of nozzle airfoils, each nozzle airfoil having a first end opposite a second end;
  a wall defining a flow path boundary, the wall having a plurality of openings therein, the second end of each nozzle airfoil protruding through one of the plurality of openings such that the second end of each nozzle airfoil extends outside of the flow path;
  a plurality of caps, one cap of the plurality of caps extending over the second end of one nozzle airfoil of the plurality of nozzle airfoils such that a separate cap extends over the second end of each nozzle airfoil;
  an airfoil aperture defined in the second end of each nozzle airfoil;
  a first cap aperture and a second cap aperture defined in each cap; and
  an attachment member,
  wherein the airfoil apertures, first cap apertures, and second cap apertures are defined on an arc, and
  wherein the attachment member extends along the arc such that the attachment member is received in the airfoil apertures, first cap apertures, and second cap apertures.

* * * * *